(12) United States Patent
Taki et al.

(10) Patent No.: US 6,481,541 B2
(45) Date of Patent: Nov. 19, 2002

(54) LUBRICATION SYSTEM FOR COUNTERSHAFT BRAKE

(75) Inventors: Masafumi Taki; Takashi Ito, both of Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/770,117

(22) Filed: Jan. 23, 2001

(65) Prior Publication Data

US 2001/0023796 A1 Sep. 27, 2001

(30) Foreign Application Priority Data

Mar. 21, 2000 (JP) ........................................ 2000-083274

(51) Int. Cl.$^7$ .............................................. B60K 17/00
(52) U.S. Cl. ...................................... 188/71.5; 475/207
(58) Field of Search ............................... 188/71.5, 71.6, 188/170; 192/216, 217.7, 220, 221, 113.3, 113.34, 113.5; 74/360, 339, 740; 475/275, 276, 278, 280–293

(56) References Cited

U.S. PATENT DOCUMENTS

| | | | |
|---|---|---|---|
| 3,309,934 A | 3/1967 | Gustafsson et al. | |
| 4,211,313 A | 7/1980 | Quick et al. | |
| 4,359,909 A | 11/1982 | Sogo | |
| 4,627,302 A | * 12/1986 | Laylock et al. | ............... 74/360 |
| 4,658,673 A | * 4/1987 | Nerstad et al. | ............... 74/769 |
| 4,924,729 A | * 5/1990 | Sherman et al. | ............ 475/207 |
| 4,994,007 A | * 2/1991 | Miura et al. | ............... 475/346 |
| 5,172,797 A | * 12/1992 | Stout et al. | ............... 192/13 R |
| 5,495,927 A | * 3/1996 | Samie et al. | ............. 192/70.12 |
| 6,206,163 B1 | * 3/2001 | Schneider | .............. 192/113.35 |

* cited by examiner

Primary Examiner—Christopher P. Schwartz
(74) Attorney, Agent, or Firm—McCormick, Paulding & Huber LLP (57) ABSTRACT

A simple arrangement (60) for lubricating a countershaft brake (58). A countershaft brake (58) is attached to an end of a countershaft (12) of a transmission (2), and a counter gear (16) is mounted on the countershaft (12) near the countershaft brake (58). An oil pool (62) is formed in a transmission housing (61) to immerse at least part of the gear (16) when the counter gear (16) is not rotating. A plate member (63) extends over the oil pool (62) for obstructing oil splashed up by rotations of the counter gear (16). An oil passage (64) is formed for introducing the oil obstructed by the plate member (63) to the countershaft brake (58).

20 Claims, 7 Drawing Sheets

LUBRICATION SYSTEM FOR COUNTERSHAFT BRAKE

BACKGROUND OF THE INVENTION

1. Field of the Invention

The present invention relates to an arrangement for lubricating a countershaft brake.

2. Description of the Related Art

One type of known vehicle automatic transmissions is a two-axis (two-shaft) transmission equipped with an automatic clutch. This automatic transmission, is sometimes equipped with a brake system for applying a brake on a countershaft in a transmission housing. Further, this type of automatic transmission does not have mechanical synchronization units so that the countershaft should be decelerated by the brake for synchronization when shifting up a transmission gear.

Specifically, during the shift up operation, a speed-change sleeve is disengaged from a spline of a lower-speed speed-change gear and engaged into a spline of a higher-speed speed-change gear. In this sleeve disengagement and engagement (or synchronization), the rotation speed (rpm) of the spline of the higher-speed speed-change gear should be reduced until it matches the rotation speed (rpm) of the speed-change sleeve. To this end, the countershaft brake reduces the countershaft rotation speed as mentioned earlier.

This countershaft brake is operated every time the shift up occurs. Thus, the countershaft brake must possess anti-burning property, anti-wear property and operation reliability. For this reason, a wet type is generally employed so as to feed lubrication oil to the brake. An associated lubrication system either causes the brake to be immersed in an oil pool or feeds pressurized oil to the brake by a pump. Both of them can suppress temperature elevation of the oil so that the braking performance is maintained.

However, if the brake should be immersed in an oil pool, the lubrication system must have space for it in a transmission housing. Further, simply immersing the brake in the oil pool is not sufficient since heat generated upon braking is accumulated in the oil pool. To overcome this, the oil is required to be circulated by a certain mechanism.

If the pressurized oil should be supplied to the brake, oil passages from the oil pump to the brake must be prepared.

SUMMARY OF THE INVENTION

An object of the present invention is to overcome the above described problems. Specifically, the object of the present invention is to provide a compact and simple lubrication system for a transmission countershaft brake.

According to one aspect of the present invention, there is provided a lubrication system for lubricating a countershaft brake including a gear mounted on a countershaft of a transmission, an oil pool formed in a transmission housing sufficient to immerse at least part of the gear in the oil pool when the gear is not rotating, a plate member for obstructing oil splashed up by rotations of the gear, and an oil passage for introducing the oil obstructed by the member to the countershaft brake. Since the gear on the countershaft is utilized as a pump to feed the oil to the countershaft brake, the lubrication system does not need a separate oil pump, and therefore can have a simple structure.

The countershaft brake may include a hub fixed to an end of the countershaft and housed in a brake casing attached to the transmission housing, a plurality of friction plates provided on the hub such that they can move in an axial direction of the transmission housing, a plurality of separator plates provided on the brake casing such that they are loosely engaged with the friction plates and can move in the axial direction of the transmission housing, and a piston provided in the brake casing such that it can move in the axial direction of the transmission for pressing the friction and separator plates against each other for tight engagement of these plates.

The piston may have at least one first oil passage for introducing the oil to an interior of the piston and hub from the oil passage. The hub may have at least one second oil passage for feeding the oil to the friction and separator plates from the interior of the hub by a centrifugal force generated upon rotations of the countershaft. An inlet of the oil passage may open above a first surface of the oil pool when the gear is rotating. If the oil inlet was immersed in the oil pool, circulation of the oil would be hindered and lubrication performance would be deteriorated. An oil return passage may further be provided for returning the oil to the oil pool from the countershaft brake. A downstream end of the oil return passage may open above the first surface of the oil pool when the gear is rotating and below a second surface of the oil pool when the gear is not rotating. The oil outlet above the oil pool surface allows the oil to easily drop from the countershaft brake to the oil pool. The oil outlet below the oil pool surface allows the oil to flow back into the countershaft from the-oil-pool. Thus, even when the gear is not rotating, the countershaft brake is lubricated. The countershaft brake may be housed in a clutch housing attached to a main housing of the transmission housing in order to use free space in the clutch housing for accommodating the countershaft brake. Even if there is no sufficient room for the countershaft brake inside the main housing of the transmission, the countershaft brake can be provided without elongating a total length of the transmission.

Additional objects, benefits and advantages of the present invention will become apparent to those skilled in the art to which this invention relates from the subsequent description of the embodiments and the appended claims, taken in conjunction with the accompanying drawings.

DETAILED DESCRIPTION OF THE INVENTION

Now, an embodiment of the present invention will be described in reference to the accompanying drawings.

Figure 8:
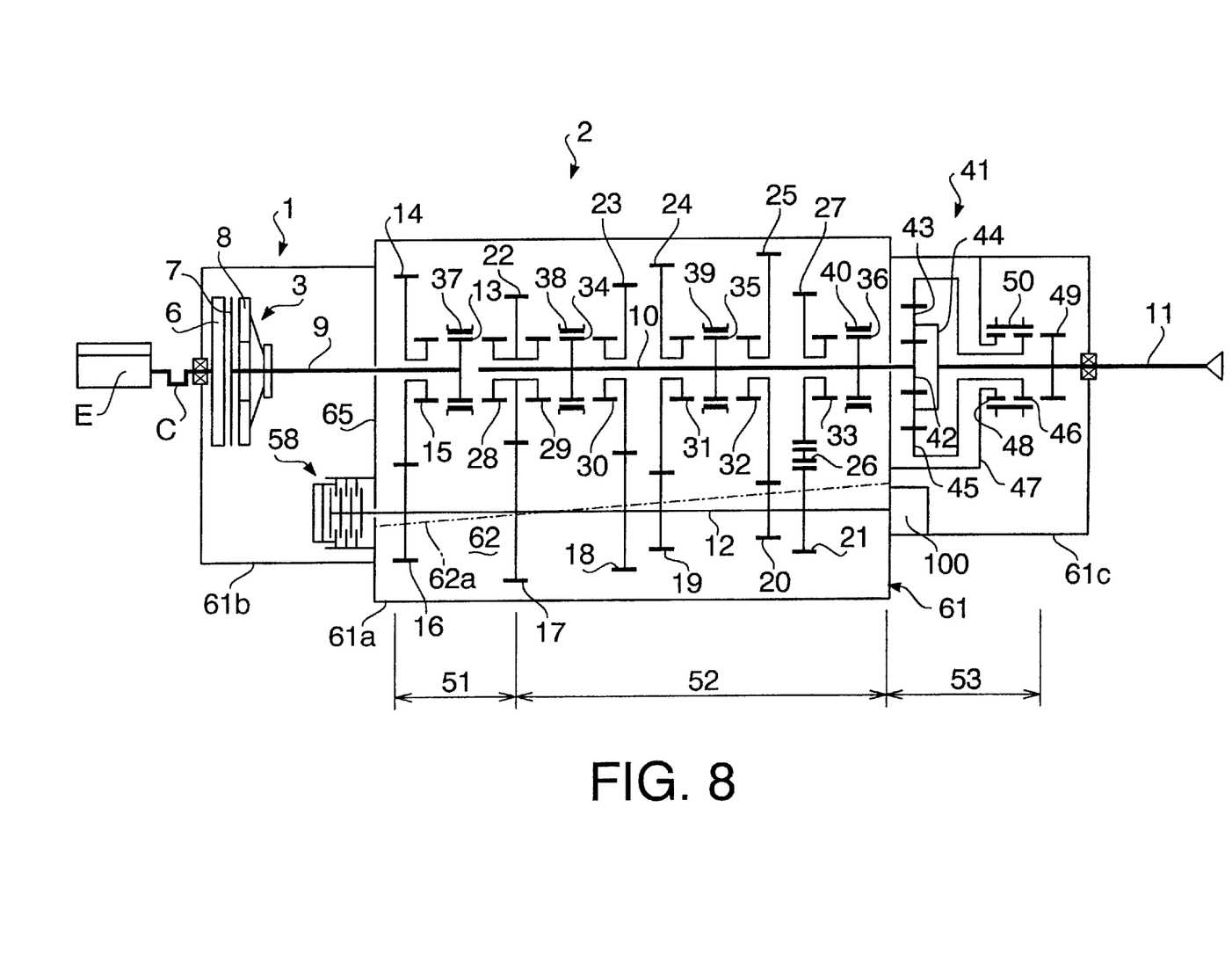
FIG. 8 schematically illustrates a structure of a transmission equipped with the countershaft brake shown in FIG. 1.

Referring first to FIG. 8, illustrated is an automatic transmission apparatus of vehicle provided with a countershaft brake lubrication system of the invention. An automatic transmission apparatus 1 includes a clutch 3 located between an engine E and transmission 2, a clutch actuator (not shown) for disengaging and engaging the clutch 3, and a controller (not shown) for sending commands to the clutch actuator for clutch disengagement and engagement. The clutch actuator is operated to disengage and engage the clutch 3 in accordance with the commands issued from the controller when starting the vehicle, shifting up and down a transmission gear, and stopping the vehicle.

The clutch 3 includes a flywheel 6 (drive plate) connected to a crankshaft C of the engine E, a driven plate 7 facing the flywheel 6, a presser plate 8 for sandwiching the driven plate 7 between the flywheel 6 and itself. The clutch actuator causes the pressure plate 8 to move toward the flywheel 6 and in the opposite direction appropriately based on the signals from the controller so as to engage and disengage the clutch. Upon engagement and disengagement of the clutch 3, an output power of the engine E is transmitted to the transmission 2 and interrupted.

The transmission 2 includes an input shaft 9 connected to the driven plate 7, a main shaft 10 coaxial to the input shaft, an output shaft 11 coaxial to the main shaft, and a countershaft 12 extending in parallel to the input, main and output shafts. The input shaft 9 has a spline 13 fixed thereon, and supports an input gear 14. The input gear 14 has a spline 15 fixed thereon.

The countershaft 12 has an input counter gear 16 meshing with the input gear 14, a fourth-gear counter gear 17, a third-gear counter gear 18, a second-gear counter gear 19, a first-gear counter gear 20 and a reverse counter gear 21, all of which are fixed thereon. The main shaft 10 supports a fourth-gear main gear 22 meshing with the fourth counter gear 17, a third-gear main gear 23 meshing with the third counter gear 18, a second-gear main gear 24 meshing with the second counter gear 19, a first-gear main gear 25 meshing with the first counter gear 20, and a reverse main gear 27 meshing with the reverse counter gear 21 via an idle gear 26.

On both sides of the fourth main gear 22, fixed are splines 28 and 29. On the left side of the third main gear 23, fixed is a spline 30. The second main gear 24 has a spline 31 fixed on its right side. The first main gear 25 has a spline 32 fixed on its left side. The reverse main gear 27 has a spline 33 on its right side. The main shaft 10 has a spline 34 fixed between the splines 29 and 30, a spline 35 fixed between the splines 31 and 32, and a spline 36 fixed on the right side of the spline 33.

The spline 13 has a sleeve 37, which couples the spline 13 to the left spline 15 or the right spline 28 or stays on the spline 13. Likewise, the spline 34 has a sleeve 38, which couples the spline 34 to the left spline 29 or right spline 30 or stays on the spline 34. The spline 35 has a sleeve 39 which engages the spline 35 with the adjacent spline 31 or 32 or stays on the spline 35. The spline 36 has a sleeve 40 which engages the spline 36 with the adjacent spline 33 or stays on the spline 36.

The sleeve 37 is equipped with a common cone-type synchronization mechanism, but the sleeves 38, 39 and 40 are not. Therefore, although it is possible to shift a transmission gear at the sleeve 37 even if the rotation speed of the sleeve 37 is not equal to the splines 15 and 28, it is not possible to shift a transmission gear at the sleeve 38 unless the rotation speed of the sleeve 38 matches the splines 29 and 30. The latter is the case when shifting a transmission gear at the sleeves 39 and 40; the rotation speed of the sleeve 39 must match the splines 31 and 32, and the rotational speed of the sleeve 40 must match the spline 33.

The main shaft 10 has a sun gear 42 of a planetary gear unit 41 at its right end. Around the sun gear 42, arranged are a plurality of planetary gears 43. These planetary gears 43 are rotatably supported by a carrier 44. Around the planetary gears 43, provided is a ring gear 45. The ring gear 45 has a spline 46 fixed thereon, and a spline 48 extends from a transmission housing 47. The output shaft 11 is secured on the carrier 44 and has a spline 49 secured thereon.

A sleeve 50 is provided for the splines 46, 48 and 49 such that it couples two adjacent splines (46 and 48, or 46 and 49). The sleeve 50 has an ordinary cone-shape synchronization unit. Therefore, shifting a transmission gear at the sleeve 50 is possible even if the rotational speed of the sleeve 50 does not coincide with the splines 46 and 48 or 46 and 49. It should be noted that the sleeves 38, 39 and 40 do not have cone-shape synchronization units, whereby an axial length of the transmission 2 can be reduced by the length of the synchronization units.

Shift folks (not shown) are associated with the respective sleeves 37, 38, 39, 40 and 50 such that they are moved by a gear shift unit in an axial direction of the transmission upon instructions from the controller. For example, when the sleeve 37 is moved to the spline 13 (i.e., neutral position) by the associated shift folk, rotations of the input shaft 9 are not transmitted to the input gear 14 and accordingly the counter shaft 12, main shaft 10 and output shaft 11 do not rotate.

When the sleeve 37 is moved over the splines 13 and 15, the rotations of the input shaft 9 are transmitted to the input gear 14 and input counter gear 16 and in turn to the counter shaft 12 at raised speed. As a result, all the counter gears 16 through 21 and main gears 22 through 27 are caused to rotate. If the sleeve 37 is moved over the splines 13 and 28, the rotations of the input shaft 9 are transmitted to the fourth main gear 22 and fourth counter gear 17 and in turn to the counter shaft 12 at reduced speed. As a result, all the counter gears 16 through 21 and main gears 22 through 27 are caused to rotate at a slower speed.

If the sleeves 38, 39 and 40 are positioned on the splines 34, 35 and 36 respectively (neutral positions), the main gears 22 through 27 simply rotate about the stationary main shaft 10. If the sleeve 39 is shifted over the splines 35 and 32, on the other hand, the first transmission gear is engaged so that the main shaft 10 is caused to rotate at a speed corresponding to the first transmission gear. Likewise, if the sleeve 39 is moved over the splines 35 and 31, the second transmission gear is engaged, if the sleeve 38 is over the splines 34 and 30, the third transmission gear is engaged, and if the sleeve 38 is over the splines 34 and 29, the fourth transmission gear is engaged.

In this situation, the sun gear 42 fixed at the right end of the main shaft 10 rotates at the same speed as the main shaft 10. Accordingly, the planetary gears 43 and ring gear 45 are caused to rotate correspondingly. When the sleeve 50 is positioned over the splines 48 and 46, the rotational speed of the sun gear 42 is reduced at a reduction ratio determined by the planetary gear set 41 and its rotations are transmitted to the output shaft 11. When the sleeve 50 is on the splines 46 and 49, the rotations of the sun gear 42 are directly transmitted to the output shaft 11.

The transmission 2 has two (high and low) gear positions at a split gear assembly 51, four (first to fourth) gear positions at a main gear assembly 52 and two (high and low)

gear positions at a range gear assembly 53. Thus, the transmission 2 has sixteen gear positions (2×4×2=16).

Neutral switches (not shown) are provided to detect the positions of the sleeves 37, 38, 39, 40 and 50 in order to determine whether the transmission 2 is in the neutral position. The neutral switches determine in combination whether or not a current gear position of the transmission is neutral based on the positions of the shift folks that move the sleeves 37, 38, 39, 40 and 50 in the axial direction of the transmission, and output a detection result to the controller.

Being neutral is determined if the sleeve 37 is over the splines 13 and 15 (or 13 and 28), the sleeve 38 is over the spline 34, the sleeve 39 is over the spline 35, the sleeve 40 is over the spline 36 and the sleeve 50 is over the splines 46 and 48 (or 46 and 49).

If it is determined that the transmission 2 is in the neutral position, and further the clutch 3 is engaged and an imaginary accelerator pedal is depressed to feed a fuel to the engine, the main gears 22 through 27 and splines 28 through 33 are caused to rotate. Accordingly, the rotation speed of the splines 28 through 33 are raised to conform to the sleeves 38 through 40 for synchronization when shifting down the transmission gear.

Specifically, when shifting down, the controller once disengages the clutch 3 to bring the transmission into a neutral condition, and then engages the clutch 3 and accelerates the engine E without any load to conform the rotation speed of the main gears 22 through 27 used for the gear change to the sleeve 38, 39 or 40 used for the gear change. After that, the clutch 3 is disengaged again and the subject sleeve 38, 39 or 40 is fitted over the subject splines 29 through 33 of the main gears 22 through 27. This is so-called double clutch control.

As described above, the controller performs the double clutch operation and causes the rotation speed of the main gears 22 through 27 involved in the gear change to match that of the sleeves 38 through 40 involved in the gear change. Therefore, although the transmission 2 does not have common cone-shape synchronization units for the sleeves 38, 39 and 40, smooth shifting can be expected. It should be noted that providing the sleeves 38, 39 and 40 with synchronization units is also acceptable. As mentioned earlier, on the other hand, the sleeves 37 and 50 have the cone synchronization units.

As described above, the imaginary accelerator pedal is utilized to accelerate the engine E without any load (or in the neutral condition) upon instructions from the controller when shifting down the transmission gear. When shifting up, on the other hand, the rotation speed of the splines 28 through 33 of the main gears 22 through 27 used in the gear change is generally greater than the sleeves 38 through 40 used in the gear change. Therefore, a countershaft brake 58 provided at the left end of the countershaft 12 inside a clutch casing 61b is utilized for decelerating the rotation speed of the splines 28 through 33 of the main gears 22 through 27 in order to conform the rotation speed of these splines to the sleeves 38 through 40.

The countershaft brake 58 adapted to adjust the rotation speed of the countershaft 12 is operated each time the shifting up takes place. Thus, the countershaft brake 58 is required to have anti-burning property, anti-wear property and operation reliability. For this reason, a wet type brake is employed; lubrication is fed to the brake 58. Now, detail of this lubrication system 60 will be described in reference to FIGS. 1 through 7.

Figure 1:
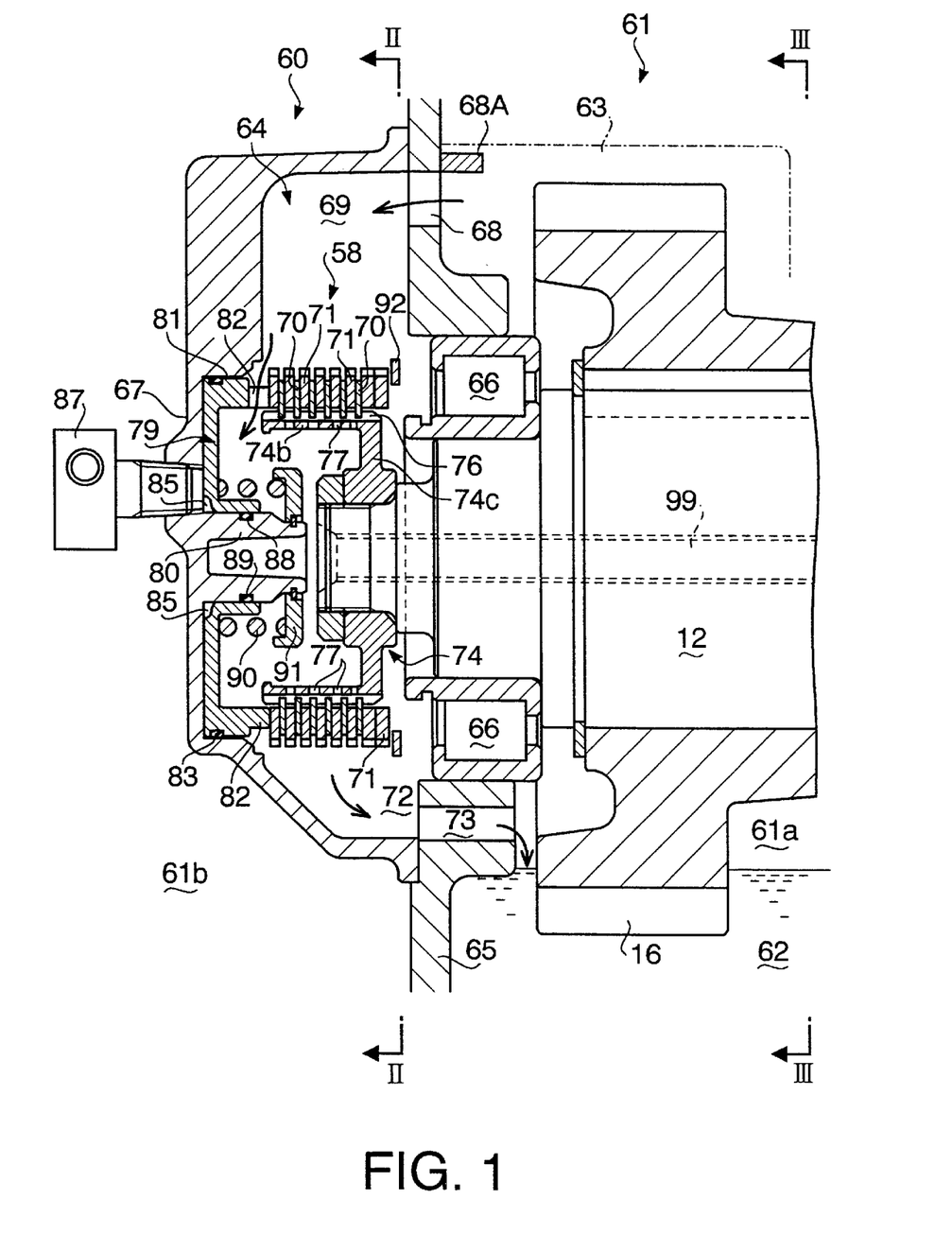
FIG. 1 illustrates a cross sectional view of a lubrication system for a countershaft brake according to the present invention, which is taken along the line I—I of FIG. 2.

Referring to FIG. 1, the lubrication system 60 includes the countershaft brake 58 provided at one end of the countershaft 12, the input counter gear 16 provided on the countershaft 12 in the vicinity of the brake 58, an oil pool 62 formed in the transmission housing 61 that immerses part of the input counter gear 16 in a stationary condition (see also FIG. 8), a rib 63 extending near the counter gear 16 for catching the oil splashed by the rotating counter gear 16 (see also FIG. 3), and an oil passage 64 for introducing the oil 62 stopped by the rib 63 to the brake 58.

The transmission housing 61 includes, as illustrated in FIG. 8, a main housing 61a for housing the split gear assembly 51 and main gear assembly 52, the clutch housing 61b for housing the clutch 3 and countershaft brake 58, and a range housing 61c for housing the range gear assembly 53. The oil pool 62 is formed in a lower area of the main housing 61a, and its surface in a stationary condition (when all the gears in the main housing 61a are still) is indicated by the chain line 62a. The oil surface 62a is inclined because the front of the transmission 2 (or its engine side) becomes higher when mounted on the vehicle.

Figure 6:
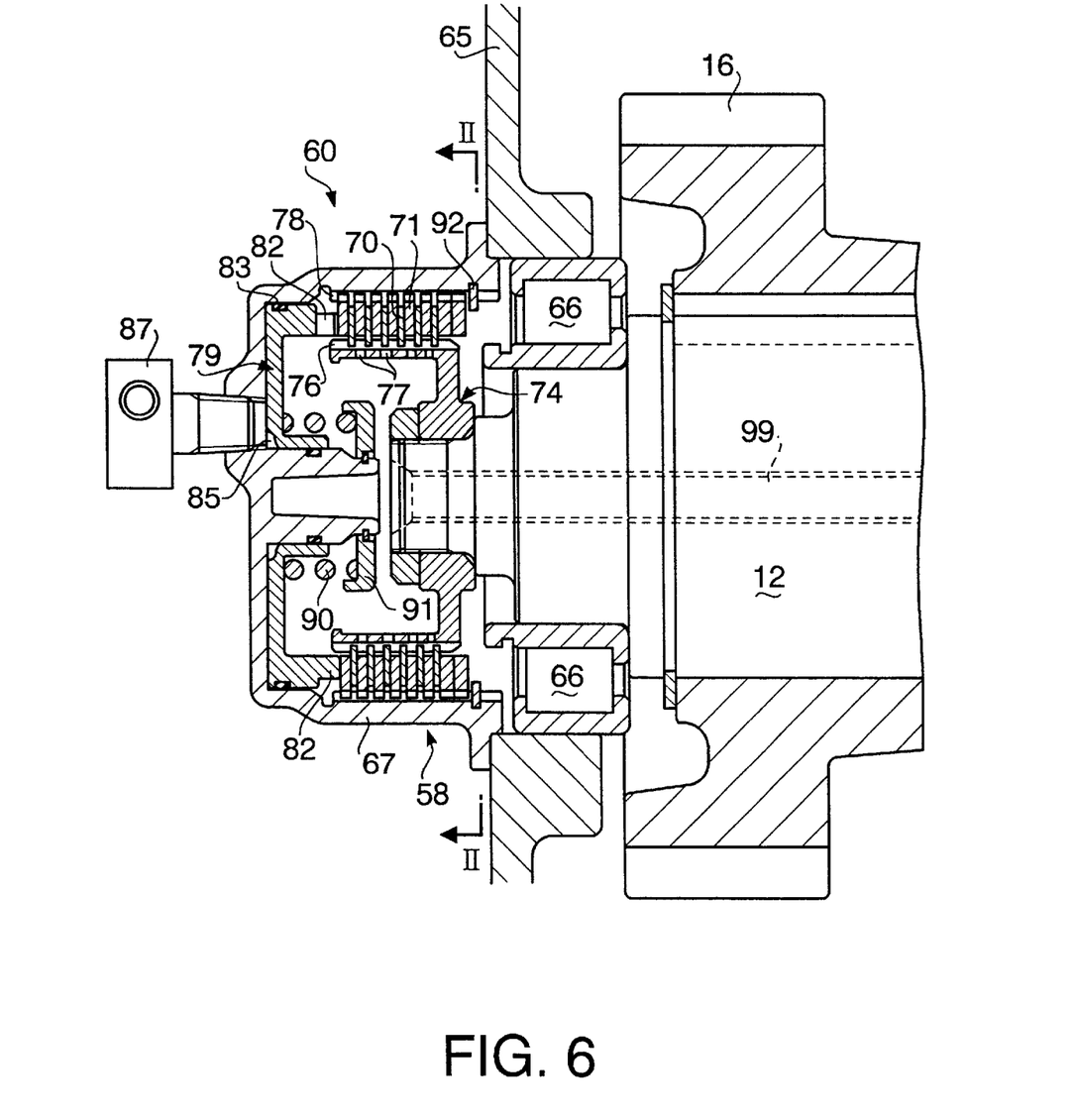
FIG. 6 is similar to FIG. 1 and illustrates another cross sectional view of the countershaft brake lubrication system, which is taken along the line VI—VI in FIG. 2.

A roller bearing 66 is buried in a partition wall 65 between the main casing 61a and clutch casing 61b for supporting an end of the countershaft 12 as illustrated in FIG. 6. A brake casing 67 is also attached to the partition wall 65 for housing the countershaft brake 58.

Figure 2:
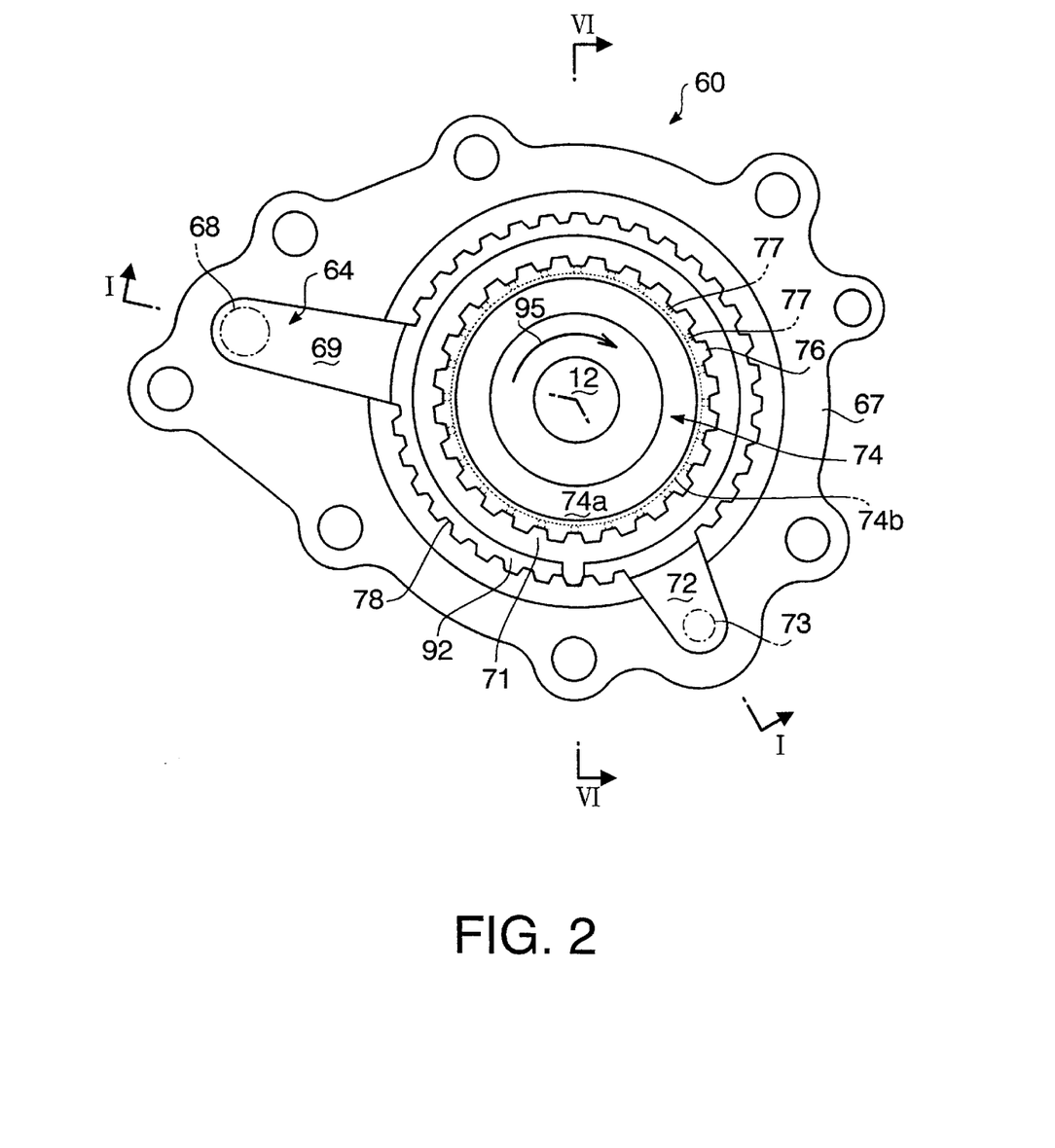
FIG. 2 illustrates a cross sectional view taken along the line II—II in FIG. 1.

It should be noted that FIG. 1 is a cross sectional view taken along the line I—I in FIG. 2 and FIG. 6 is a cross sectional view taken along the line VI—VI in FIG. 2.

As shown in FIG. 1, the partition wall 65 has an oil inlet 68 for introducing the oil into the brake casing 67 from the main casing 61a. An oil guide space or passage 69 is defined next to the oil inlet 68 inside the brake casing 67 such that the oil passing through the oil inlet 68 is guided to the countershaft brake 58 by this passage. The oil guides passage 69 is a recess formed above the countershaft brake 58 in the brake casing 67. The oil inlet 68 and guide passage 69 constitute in combination an oil path 64 for introducing the oil to the countershaft brake 58 from the main casing 61a.

Inside the brake casing 67 below the countershaft brake 58, defined is an oil discharge space or passage 72 for returning the oil to the main casing 61a after the oil has lubricated various parts in the brake casing 67 such as friction plates 70 and separator plates 71. This oil discharge passage 72 is a lower recess in the brake casing 67. The partition wall 65 has an oil outlet 73 below the bearing 66 which connects the oil discharge passage 72 to the main casing 61a so that the oil can return to the oil pool 62 in the main casing 61a.

A hub 74 is secured on the left end of, the countershaft 12 and located in the brake casing 67. The hub 74 includes a disc portion 74a mounted on the countershaft end and a cylindrical portion 74b extending from the disc portion 74a in the axial direction of the transmission 2. As best seen in FIG. 2, a spline 76 is formed on the periphery of the cylindrical portion 74b.

The cylindrical portion 74b has second passages 77 (see also FIG. 7) at valley portions of the spline 76 (or between each two adjacent convex portions of the spline) to, allow the oil inside the hub 74 to escape to the outside by centrifugal force upon rotations of the countershaft 12. The second passages 77 are formed at predetermined intervals in the axial direction of the cylinder portion 74b (or transmission 2) and also predetermined intervals in the circumferential direction of the cylinder portion 74b as shown in FIG. 2.

Figure 7:
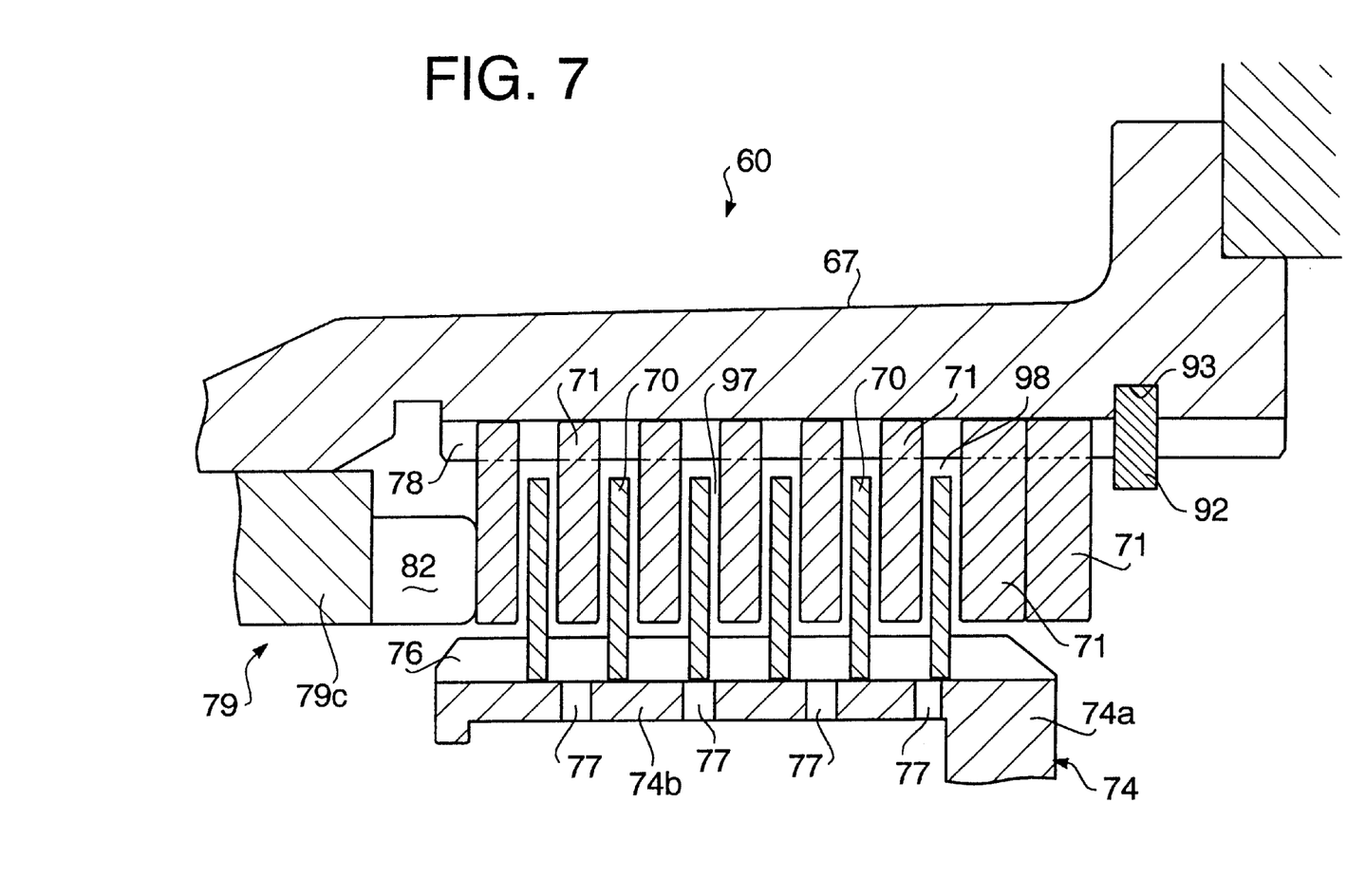
FIG. 7 illustrates an enlarged view of the countershaft brake.

As illustrated in FIGS. 1 and 7, a plurality of friction plates 70 are engaged with the spline 76 of the cylindrical portion 74b such that they can move in the axial direction of the cylindrical portion 74b along the spline 76. A plurality of separator plates 71 are engaged with the friction plates 70 such that each two adjacent separator plates sandwich a single friction plate 70. The separator plates 71 are engaged with a spline 78 formed on an inner peripheral surface of the brake casing 67 and can move in the axial direction of the cylindrical portion 74b.

Figure 5A:
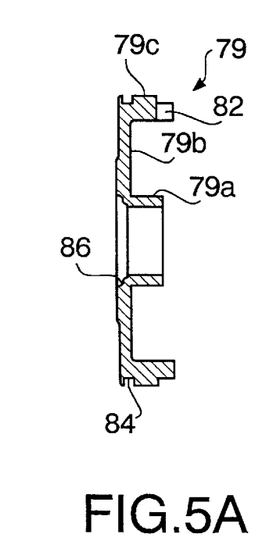
FIG. 5A illustrates a cross sectional view of a piston taken along the line a—a in FIG. 5B.

As illustrated in FIG. 6, a cylindrical piston 79 is provided on the left side of the brake 58 inside the brake casing 67 to press the separator plates 71 against the friction plates 70. The cylindrical piston 79 is slidable in the axial direction (right and left in the drawing). As best shown in FIG. 5A, the piston 79 includes an inner annular (or cylindrical) portion 79a, which is sidably fitted on a boss 80 of the brake casing 67 (FIG. 1), a donut-shaped disc portion 79b extending from the inner cylindrical portion 79a, and an outer annular portion 79c extending from the outer periphery of the disc portion 79b and sidably fitted in a recess 81 of the brake casing 67 (FIG. 1).

Figure 5B:
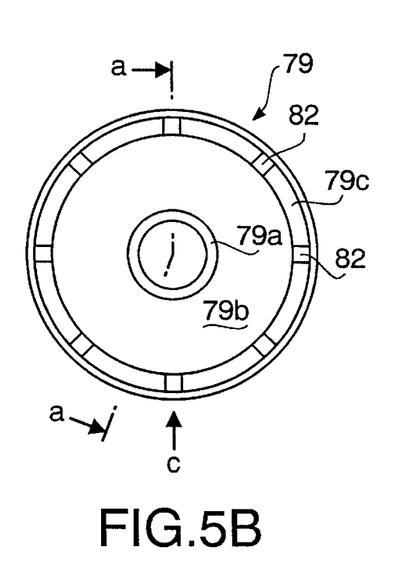
FIG. 5B illustrates a rear view of the piston.
Figure 5C:
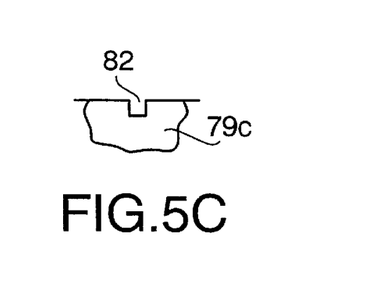
FIG. 5C illustrates an illustration of the piston as viewed from the direction of arrow c in FIG. 5A.

The outer annular portion 79c of the piston 79 has a plurality of first openings 82 for introducing the oil into the interior of the hub 74 and piston 79 from the oil passage 64 as shown in FIGS. 1 and 5B. The first openings 82 are grooves formed on the edge of the annular portion 79c at predetermined intervals in the circumferential direction of the annular portion 79c as best seen in FIGS. 5A and 5B. The annular portion 79c also has an annular groove 84 in its outer peripheral wall for receiving a ring-shaped seal 83 (FIG. 1). At the connection of the inner annular portion 79a and disc portion 79b, formed is a recess or shoulder portion 86 that defines an air chamber 85 (FIG. 1). Pressurized air is supplied into this air chamber 85 from an air feed nut 87 screwed into the brake casing 67.

The boss 80 of the brake casing 67 has an annular groove 89 in its middle for reception of a seal 88 and a retainer 91 at its right end for supporting a return spring 90 of the piston 79. Thus, when high pressure air is supplied to the air chamber 85 from the air feed nut 87, the piston 79 is caused to move to the right in the drawing, whereby the friction plates 70 and separator plates 71 are moved until they collide a stop ring 92. As a result, the friction plates 70 and separator plates 71 are pressed against each other. This brings about a brake force to decelerate the countershaft 12.

As the high pressure air feeding is stopped and the air is released from the air chamber 85, the piston 79 is returned to the left original position by the spring 90. Accordingly, the friction plates 70 and separator plates 71 are released from each other. This ends application of the brake force so that the countershaft 12 is no longer decelerated. The stop ring 92 is a snap ring partly buried in a groove 93 in an inner wall of the brake casing 67 as shown in FIG. 7.

Figure 3:
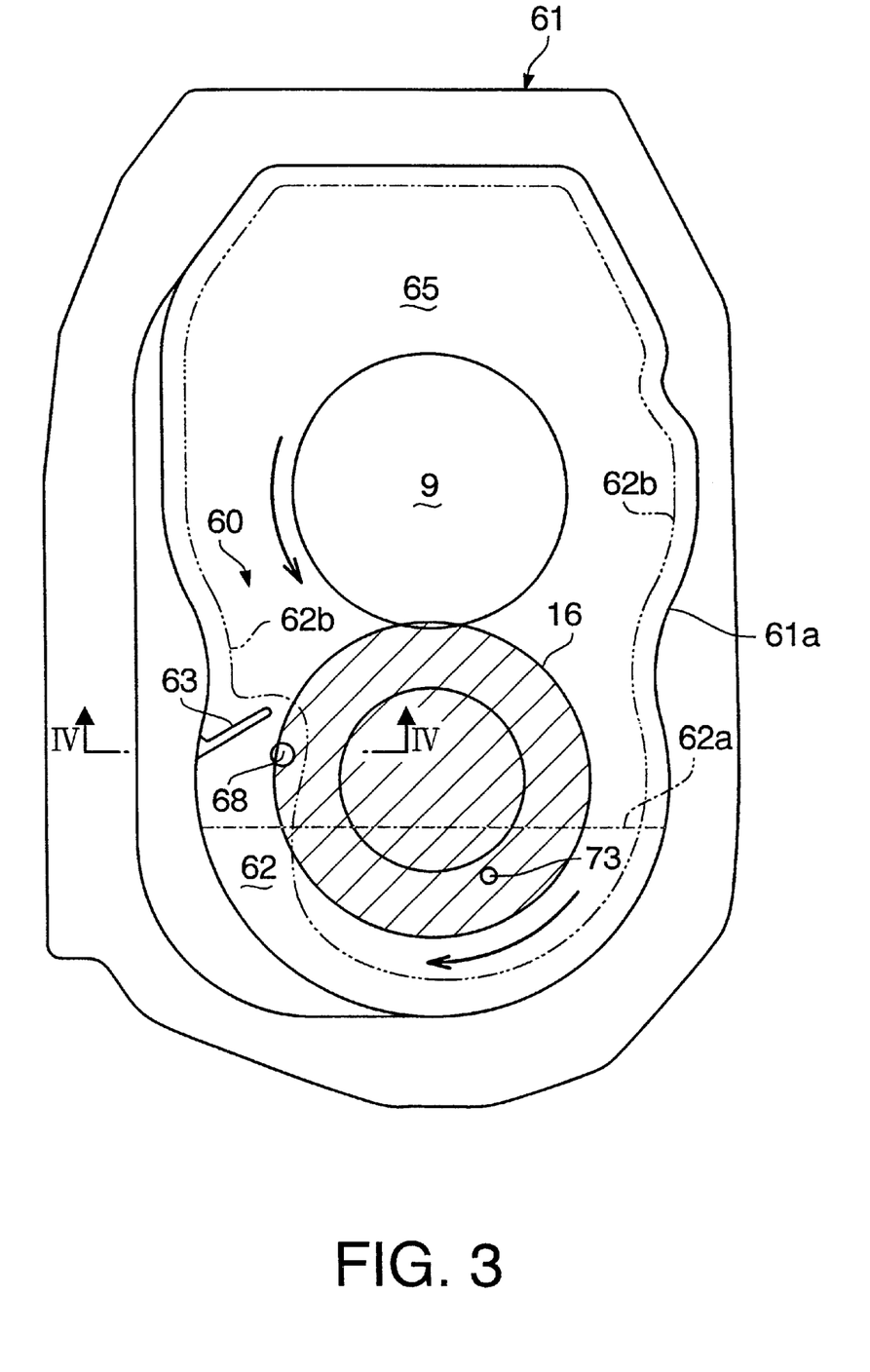
FIG. 3 illustrates a cross sectional view taken along the line III—III in FIG. 1.

Referring now to FIG. 3, the oil is stored in the main casing 61a of the transmission housing 61 as mentioned earlier. The oil surface when the gears in the main casing 61a are not rotating is indicated by the chain line 62a. Part of the input counter gear 16 is immersed in the oil 62 in this condition. If the input counter gear 16 rotates from this condition, it splashes the oil upwards and therefore the oil adheres on the inner wall of the main casing 61a as indicated by the double chain line 62b. When the input counter gear 16 rotates, all other gears in the main casing 61a rotate.

The rib 63 extends diagonally upwards from the lower inner wall of the main casing 61a to obstacle the oil splashing. The rib 63 is located at a position which can introduce the oil to the oil inlet 68. For this reason, the rib 63 extends slightly above the oil inlet 68. A guide member 68a (FIG. 1) is also provided in the vicinity of the oil inlet 68 to further facilitate the introduction of the oil into the oil inlet 68.

Figure 4:
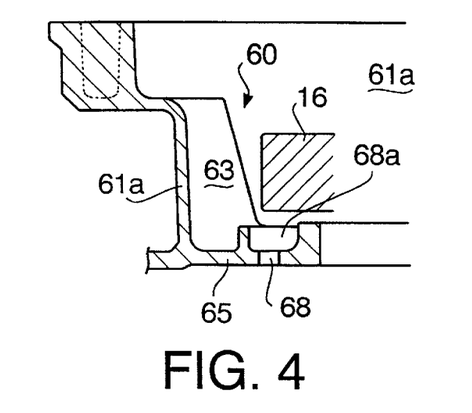
FIG. 4 illustrates a cross sectional view taken along the line IV—IV in FIG. 3.

The oil inlet 68 is, positioned above the oil pool surface 62a in FIG. 3 whereas the oil outlet 73 is below the oil surface 62a. The width of the rib 63 is greater than the input counter gear 16 as shown in FIG. 4.

Now, an operation of the lubrication system 60 will be described.

Referring to FIGS. 3 and 8, the oil pool 62 in the main casing 61a of the transmission casing 61 has the surface 62a when no gears rotate in the main casing 61a, as described above. As the gears in the main casing 61a rotate, the oil is splashed by the rotating gears such as the input counter gear 16 and other counter gears, and therefore adheres to the inner wall of the main casing 61a as indicated by the double chain line 62b.

After that, the splashing oil is at least partly deflected by the rib 63 towards the guide member 68a and oil inlet 68 (FIG. 1). Thus, the oil flows to the brake casing 67 from the main casing 61a. After passing the oil inlet 68, the oil flows in the oil passage 64 and in turn to the openings 82 of the piston 79. It should be noted here that those openings 82 that face the oil passage 69 primarily receive the oil. The oil then flows in the piston and sleeves.

The oil from the oil passage 69 is smoothly introduced to the piston 79 and hub 74 via the openings 82 of the piston 79 since the piston 79 does not rotate although the hub 74 rotates with the countershaft 12. The oil from the oil passage 69 is also supplied to the friction plates 70 and separator plates 71, which are exposed to the oil passage 69, but the friction plates 70 rotate with the hub 74 and generate a centrifugal force so that the oil is hardly introduced to the piston 79 and hub 74 via the second passages 77.

Most of the oil introduced to the piston 79 and hub 74 is subjected to the centrifugal force generated from the hub 74 upon rotations of the countershaft 12. As a result, the oil is discharged from the second passages 77 of the hub 74 radiantly, and reaches the inner wall of the brake casing 67 (spline 78) through the gaps 97 between the friction plates 70 and separator plates 71 (FIG. 7). In this process, the friction plates 70 and separator plates 71 are cooled, cleaned and lubricated by the oil passing their gaps 97.

As shown in FIG. 7, the second oil passages 77 are arranged to feed the oil between each two adjacent friction plates 70 so that all the friction plates 70 and separator plates 71 are lubricated by the oil. Since the routes of oil are sectioned by the friction plates 70 and separator plates 71, the oil does not flow in the axial direction of the brake casing 67. The size and locations of the second oil passages 77 are determined in this manner. It should be noted, however, that the size and locations of the passages 77 are not limited to those illustrated in FIG. 7.

The oil forced into the gaps 97 between the friction plates 70 and separator plates 71 by the centrifugal force is then guided to the oil outlet 72 of the brake casing 67 as shown in FIG. 2 as it moves on the rotating friction plates 70 in the circumferential direction upon rotations of the hub 74. In FIG. 2, the clockwise arrow 95 indicates the direction of rotation of the hub 74 (or countershaft 12). The friction plates 70 and separator plates 71 are spaced from each other as shown in FIG. 7 when the countershaft brake 58 is turned off.

On the other hand, when the countershaft brake 58 is turned on, i.e., when the friction plates 70 and separator plates 71 are forced against each other, the oil on the;periphery of the friction plates 70 or in the space 98 moves with the slowly rotating friction plates 70 since the countershaft brake 58 decelerates the friction plates 70 and the friction plates 70 rotate at a reduced speed. Eventually, the oil is guided to the oil outlet 72.

The oil in the piston 79 and hub 74 is discharged from not only the second oil passages 77 but also, as shown in FIG. 1, the fist oil passages 82 formed in the piston 79. Those first oil passages 82 which faces the oil discharge passage 72 in FIG. 5A primarily discharge the oil. The discharged oil is guided to the lower oil passage 72 of the brake casing 67. In this manner, the oil is collected to the lower oil passage 72 through various routes, and then returned to the main casing 61a from the brake casing 67 through the oil outlet 73 of the partition wall 65. After that, the oil is splashed again by the gear 16 and circulated.

As illustrated in FIG. 3, the oil outlet 73 is lower than the oil surface 62a when the gear 16 is not rotating, but becomes higher than the oil surface 62b when the gear 16 rotates since the oil is caused to adhere on the inner wall of the main casing 61a by the rotating gears. Consequently, the oil drops to the oil surface 62b from the brake casing 67 by gravity when the gear 16 is rotating. Thus, the oil is smoothly introduced into the main casing 61a from the brake casing 67 via the oil outlet 73. In other words, flow of the oil is not stopped by the oil in the main casing 61a. When the gear 16 is still, the countershaft 12 is also still so that there is no need to apply a brake force to the countershaft 12. Accordingly, no problem would arise.

As described above, the lubrication system 60 for the countershaft brake 58 employs the input counter gear 16 as a means for scooping up, pressurizing and feeding the lubrication oil. The scooped up oil is caught by the rib 63 and introduced to the brake casing 67 from the main casing 61a. Therefore, a separate oil pump is not required. In addition, a separate oil pool for immersing the counter brake 58 is unnecessary so that a compact and simple lubrication system is realized.

It should be noted that an oil bore 99 is formed along a center line of the countershaft 12 as shown in FIG. 1, and the oil pressurized by an oil pump 100 (FIG. 8) located on the right end of the countershaft 12 is partly fed to the piston 79 and hub 74 via the axial bore 99 of the countershaft 12 in the illustrated embodiment. However, the axial bore 99 may be dispensed with. Further, the transmission 2 is not limited to the illustrated one; the present invention may be applied to an ordinary two-shaft four-gear (four-shift-position) or five-gear transmission.

The illustrated and described lubrication system is disclosed in Japanese Patent Application No. 2000-83274 filed on Mar. 21, 2000, the instant application claims priority of this Japanese Patent Application, and the entire disclosure thereof is incorporated herein by reference.

What is claimed is:

1. A lubrication system comprising:
   a countershaft rotatably mounted in a transmission housing and extending in an axial direction of the transmission housing;
   a countershaft brake being adapted to apply a brake force to the countershaft;
   a gear mounted on the countershaft;
   an oil pool formed in the transmission housing sufficient to immerse part of the gear in the oil pool when the gear does not rotate;
   a member for obstructing oil splashed up by the rotating gear; and
   an oil passage for introducing the oil obstructed by the member to the countershaft brake,
   wherein the countershaft brake includes a hub fixed to a longitudinal end of the countershaft and housed in a brake casing attached to the transmission housing, a plurality of first plates provided on the hub such that they can move in the axial direction of the transmission housing, a plurality of second plates provided on the brake casing such that they are loosely engaged with the plurality of first plates and can move in the axial direction of the transmission housing, and a piston provided in the brake casing such that it can move in the axial direction of the transmission housing for pressing the plurality of first and second plates against each other for tight engagement of first and second plates.

2. The lubrication system according to claim 1, wherein the piston has at least one first oil passage for introducing the oil to an interior of the piston and hub from the oil passage.

3. The lubrication system according to claim 2, wherein the hub has at least one second oil passage for feeding the oil to the first and second plates from the interior of the hub by a centrifugal force generated upon rotations of the countershaft.

4. The lubrication system according to claim 3, wherein an inlet of the oil passage opens above a surface of the oil pool when the gear is rotating.

5. The lubrication system according to claim 3 further including an oil return passage for returning the oil to the oil pool from the countershaft brake.

6. The lubrication system according to claim 5, wherein a downstream end of the oil return passage opens above a first surface of the oil pool when the gear is rotating and below a second surface of the oil pool when the gear is not rotating.

7. The lubrication system according to claim 3, wherein the countershaft brake is housed in a clutch housing attached to a main housing of the transmission housing.

8. The lubrication system according to claim 1 further including an oil return passage for returning the oil to the oil pool from the countershaft brake.

9. The lubrication system according to claim 8, wherein a downstream end of the oil return passage opens above a first surface of the oil pool when the gear is rotating and below a second surface of the oil pool when the gear is not rotating.

10. The lubrication system according to claim 1, wherein an inlet of the oil passage opens above a surface of the oil pool when the gear is rotating.

11. The lubrication system according to claim 1 further including an oil discharge passage for discharging the oil from the countershaft brake, and wherein a downstream end of the oil discharge passage opens above a first surface of the oil pool when the gear is rotating and below a second surface of the oil pool when the gear is not rotating.

12. The lubrication system according to claim 1, wherein the countershaft brake is housed in a clutch housing attached to a main housing of the transmission housing.

13. The lubrication system according to claim 1 further including a pump for feeding oil to the countershaft brake through an axial bore formed in the countershaft.

14. The lubrication system according to claim 1, wherein the obstructing member is a plate member extending over the oil pool.

15. The lubrication system according to claim 1, wherein an inlet of the oil passage opens above a surface of the oil pool when the gear is not rotating.

16. The lubrication system according to claim 2, wherein the oil passage also feeds the oil to the plurality of first and second plates by allowing the oil to drop by gravity of the oil.

17. A lubrication system comprising:

a countershaft provided in the transmission;

a countershaft brake adapted to apply a brake force to the countershaft;

means mounted on the countershaft for scooping up oil in a transmission casing upon rotations of the countershaft;

means for catching the oil scooped up; and passage means for introducing the oil caught by the catching means to the countershaft brake, wherein the countershaft brake includes a hub fixed to a longitudinal end of the countershaft and housed in a brake casing attached to a transmission casing, a plurality of first plates provided on the hub such that they can move in the axial direction of the transmission casing, a plurality of second plates provided on the brake casing such that they are loosely engaged with the plurality of first plates and can move in the axial direction of the transmission casing, and a piston provided in the brake casing such that it can move in the axial direction of the transmission casing for pressing the plurality of first and second plates against each other for tight engagement of first and second plates.

18. The system of claim 17, wherein the means mounted on the countershaft is at least one gear.

19. A lubrication system comprising:

a countershaft rotatably mounted in a transmission housing and extending in an axial direction of the transmission housing;

a countershaft brake being adapted to apply a brake force to the countershaft;

a gear mounted on the countershaft;

an oil pool formed in the transmission housing sufficient to immerse part of the gear in the oil pool when the gear does not rotate;

a member for obstructing oil splashed up by the rotating gear; and an oil passage for introducing the oil obstructed by the member to the countershaft brake, wherein the countershaft brake includes a hub fixed to a longitudinal end of the countershaft and housed in a brake casing attached to the transmission housing, a plurality of first plates provided on the hub such that they can move in the axial direction of the transmission housing, a plurality of second plates provided on the brake casing such that they are loosely engaged with the plurality of first plates and can move in the axial direction of the transmission housing, and a piston provided in the brake casing such that it can move in the axial direction of the transmission housing for pressing the plurality of first and second plates against each other for tight engagement of first and second plates, and wherein the piston has at least one first oil passage for introducing oil to an interior of the piston and the hub from the oil passage.

20. A lubrication system comprising:

a countershaft provided in the transmission;

a countershaft brake adapted to apply a brake force to the countershaft;

means mounted on the countershaft for scooping up oil in a transmission casing upon rotations of the countershaft;

means for catching the oil scooped up; and passage means for introducing the oil caught by the catching means to the countershaft brake, wherein the countershaft brake includes a hub fixed to a longitudinal end of the countershaft and housed in a brake casing attached to a transmission casing, a plurality of first plates provided on the hub such that they can move in the axial direction of the transmission casing, a plurality of second plates provided on the brake casing such that they are loosely engaged with the plurality of first plates and can move in the axial direction of the transmission casing, and a piston provided in the brake casing such that it can move in the axial direction of the transmission casing for pressing the plurality of first and second plates against each other for tight engagement of first and second plates, and wherein the piston has at least one passage means for introducing the oil to an interior of the piston and the hub from the passage means for introducing the oil caught by the catching means to the countershaft brake.

* * * * *